May 6, 1952     G. J. VAN AMERSFORT     2,595,996
MOLDING MACHINE
Filed March 23, 1945     2 SHEETS—SHEET 1
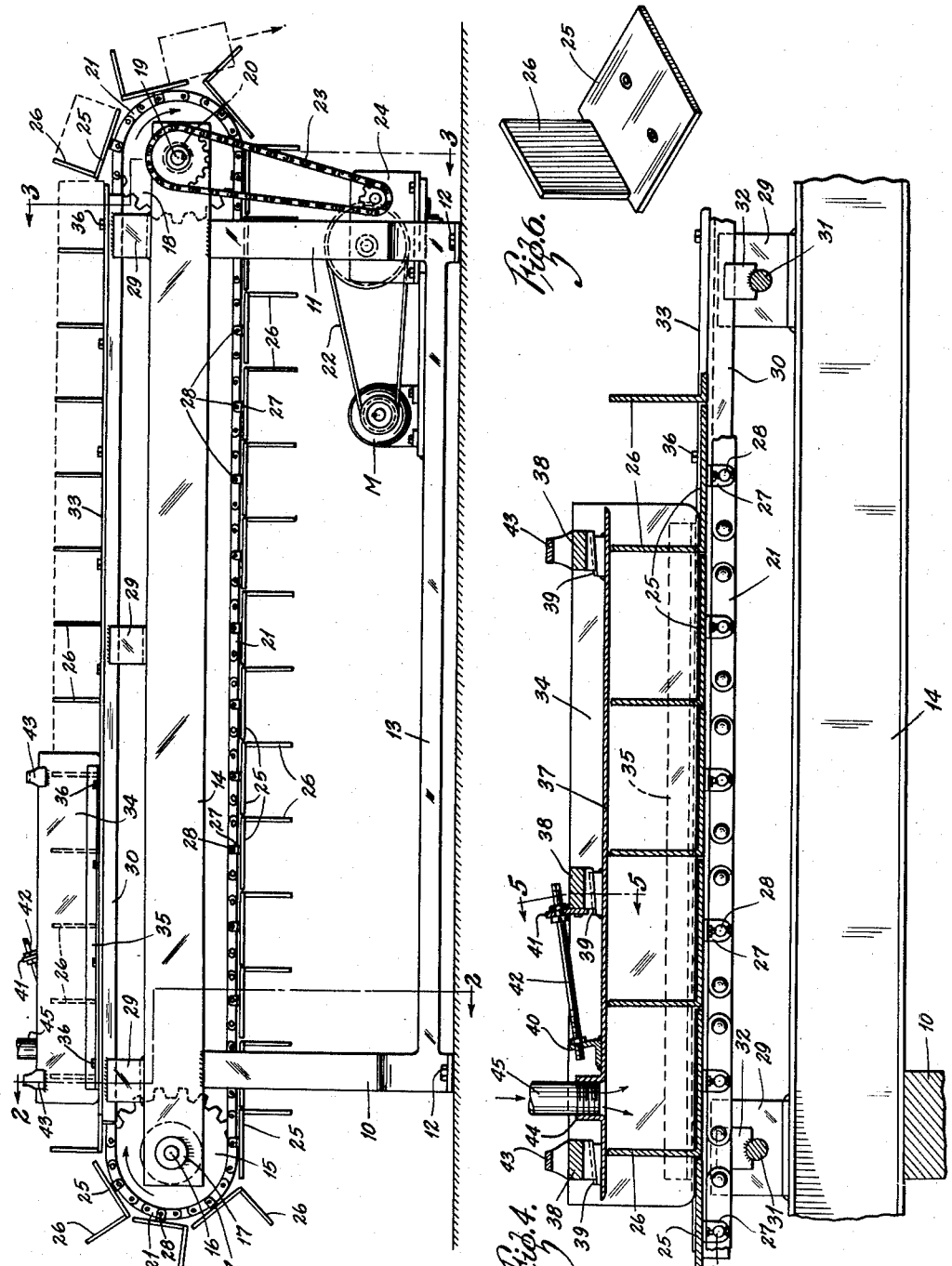
INVENTOR:
GERRIT J. VAN AMERSFORT,
By Kingsland, Rogers & Ezell
ATTORNEYS.

May 6, 1952  G. J. VAN AMERSFORT  2,595,996
MOLDING MACHINE
Filed March 23, 1945  2 SHEETS—SHEET 2
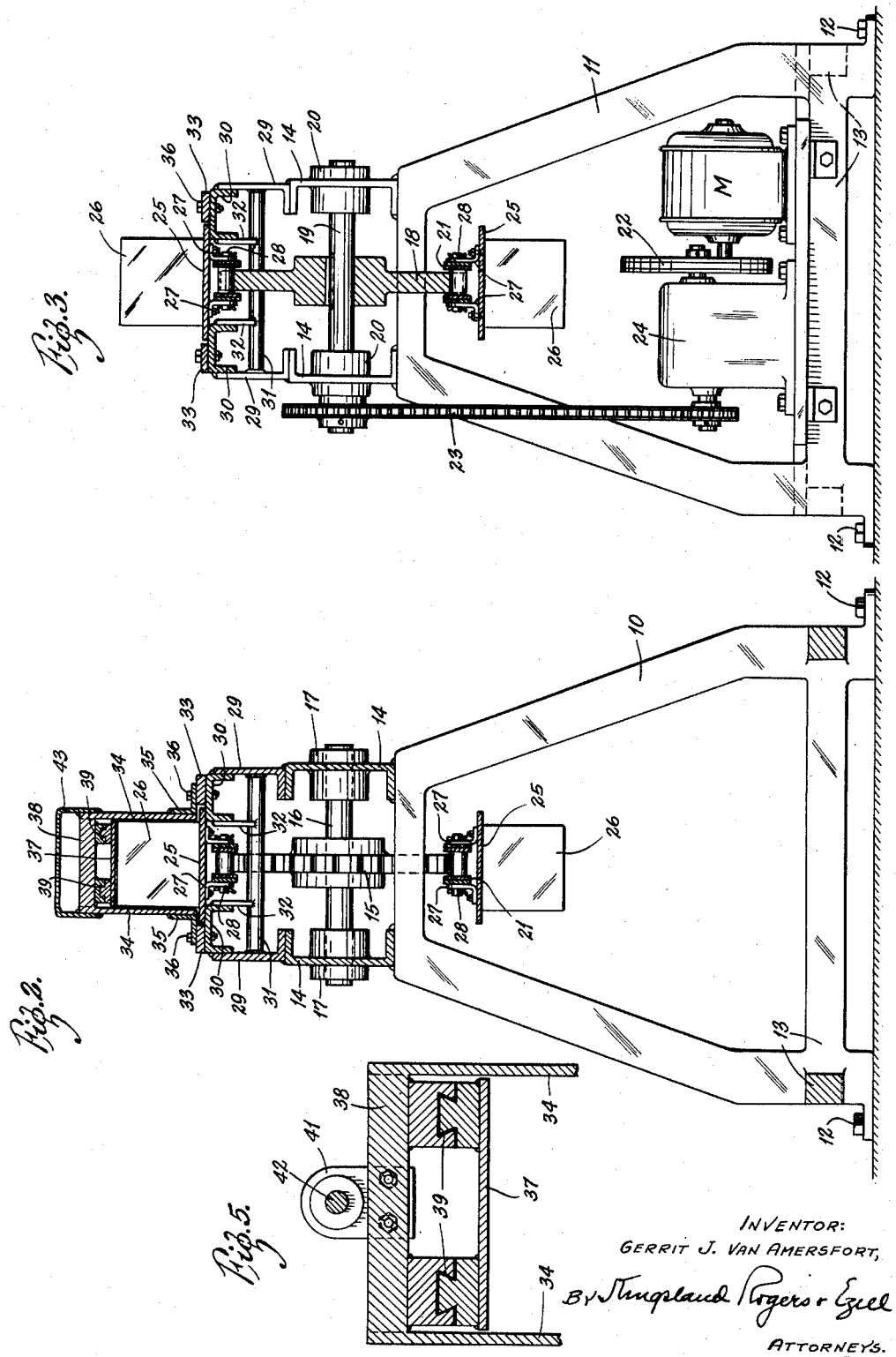
INVENTOR:
GERRIT J. VAN AMERSFORT,
By Kingsland, Rogers & Ezell
ATTORNEYS.

Patented May 6, 1952

2,595,996

UNITED STATES PATENT OFFICE 2,595,996

MOLDING MACHINE

Gerrit J. Van Amersfort, St. Louis, Mo.

Application March 23, 1945, Serial No. 584,323

10 Claims. (Cl. 107—8)

1

This invention relates to a molding machine which is primarily, although not exclusively, adapted to mold such material as baker's puff-paste into blocks or prints of predetermined volumetric content or weight.

A general object of the invention is to provide automatic means for measuring and solidifying blocks or prints of such material as baker's puff-paste by introducing the same, while in liquid phase and while chilled, into progressively moving chambers of predetermined volumetric capacity in which the material sets during movement through the machine so that the solidified blocks or prints are formed and removed from the apparatus in commercial sizes automatically and continuously, whereby the output is substantially increased and the cost decreased as compared with present practice.

A further object of the invention is to provide a continuously operating mechanism in which an endless conveyor carrying a series of plates is moved through a tunnel whereby progressively moving chambers are provided in which the material is received, in liquid phase and while chilled, in such a manner as to measure the same and cause it to set into blocks or prints as the chambers are advanced by the movement of the conveyor.

Another object of the invention is to provide in an apparatus of this class means whereby the volumetric content of the moving chambers may be varied in order to produce blocks or prints of accurate, predetermined weight.

The more specific objects of the invention will be apparent from the following detailed description taken in connection with the drawings, in which:

Fig. 1 is a side elevation of the apparatus;

Fig. 2 is a cross section taken substantially on the line 2—2 of Fig. 1;

Fig. 3 is a cross section taken substantially on the line 3—3 of Fig. 1;

Fig. 4 is a vertical section through the forward end of the machine, certain of the parts being broken away;

Fig. 5 is a detailed section taken on the line 5—5 of Fig. 4; and

Fig. 6 is a detailed view of one of the angle plates removed from the conveyor.

The frame of the machine includes two end standards 10 and 11 arranged to be bolted permanently in place by bolts 12. The standards 10 and 11 are of a generally truncated cone shape, as illustrated in Figs. 2 and 3, and are tied together near their lower extremities by a rectang-

2 ular frame 13 that extends end to end and across the frame members. Integrally connected with the upper face of the frame members 10 and 11 is a pair of U-shaped side bars 14 in which a sprocket 15 is mounted on the shaft 16 and rotatable in bearings 17 carried, respectively, by said members 14 near one end, and at the opposite end of the machine is a second sprocket 18 mounted on a shaft 19 and supported in bearings 20 carried by the side members 14, respectively. An endless chain belt 21 is mounted over said sprockets 15 and 18, respectively.

The power mechanism for driving said belt includes a motor M which, by a belt and pulley drive 22, drives a chain and sprocket connection 23 with the shaft of the sprocket 18 through a change or adjusting gear box 24. This arrangement for driving the chain belt 21 permits the speed of the belt to be regulated.

The chain belt 21 carries, at spaced intervals, a series of pivoted plates of the form shown in Fig. 6. Each of these plates comprises a horizontal wall 25 and a vertical wall 26, and they are pivotally connected with the chain belt 21 by brackets 27 on the lower face of the plates 25. The brackets 27 are supported on short stud shafts 28 carried by the respective spaced links of the chain belt 21. The chain belt 21 is driven in the direction of the arrow in Fig. 1, and on the top of the machine is provided a structure that constitutes a guide and support for the plates as they move in a horizontal direction across the top of the machine, and also supports a tunnel member hereinafter more fully described.

The support referred to includes spaced pairs of angle plates 29 connected to the top wall of the members 14, respectively. These angle plates 29 support inverted U-shaped rails 30 that extend from end to end of the machine, the relationship of the members 29 and 30 being best shown in Figs. 2 and 3, from which it will be noted that the outer wall of each of the members 30 telescope within the space between the inner faces of the vertical walls of the members 29. Additional support for the members 30 is provided by a series of spaced tie rods 31 carrying plates 32 welded or otherwise secured to the inner faces of the members 30, respectively. On the top face of each of the members 30 are longitudinal plates 33 that are spaced inwardly from the inner faces of the members 30, so that the extending edges of the plates 25 ride upon the upper walls of the members 30, and are guided and held in position from lateral displacement by the members 33.

At the forward or entrance end of the machine is a tunnel construction that comprises side plates 34 secured to the members 30 and 33 by angular plates 35, and bolts 36 that pass through the angle plates 35 and the members 33 and 30. The plates 34 extend longitudinally for approximately one-third the length of the machine, which will be observed by reference to Fig. 1, and associated with the side member 34 of the tunnel is an adjustable top plate 37. The plate 37 is supported by a plurality of inclined plane keyways, the details of the construction of which will be apparent from Fig. 5. The structure comprises for each of the supports a cross bar 38 and an inclined plane keyway 39 at each side of the bar. In order to adjust the plate 37 vertically, there is provided on the top of the plate a bracket 40 and on one of the cross bars 38 a bracket 41. A screw rod 42 is supported in the bracket 40 and is threaded into the bracket 40, and thereby provides means for moving the plate 37 a slight distance longitudinally, which movement, because of the inclined keyway construction of the support of the plate, raises and lowers the plate a slight measured distance.

In order to provide for removing the tunnel construction as a unit, handles 43 are provided in the form of U-shaped members and are mounted adjacent to the respective ends of the plates 34, with which said handles are connected.

Near the forward end of the plate 37 is a hollow boss 44, into which a filler pipe 45 is connected.

The operation of the machine for the purpose for which it is designed and the method of preparing blocks or prints of puff-paste may be generally described as follows:

As previously indicated, the primary purpose of the machine of the present construction is for the production of solidified blocks or prints of baker's puff-paste. The material is prepared in such a manner that it is delivered to the machine under pressure through the filler pipe 45.

Baker's puff-paste, the material that the machine of the invention is primarily designed to process, consists approximately of four parts animal tallow and six parts of cotton-seed oil, to which is added salt and moisture, the oil mixture being approximately ninety percent of the whole.

This material is processed in an emulsifying chilling machine which comprises a vat or tank that is refrigerated and in which the material is agitated, generating a head pressure of approximately seventy-five pounds on the mixture that remains in liquid phase. The characteristic of this material is such that, when the pressure is released by discharging it through the filler pipe into the block or print forming chambers, it will relatively rapidly harden or solidify even though the temperature rises.

It will be noted from the description that as the chain belt is advanced from the forward end of the machine closed chambers are formed below the filler pipe 45. Since the bottom and end walls of the chambers are formed from the plates 25 and 26, the outer side walls and top wall of the tunnel being stationary, they are adapted to receive a measured quantity of material entering the filler opening 44 in the plate 37 while the respective members 25 and 26 move forwardly in the machine.

The timing of the operation of the chain belt 21 is such that the successive chambers will be in communication with the filler opening a sufficient time to receive a full charge of the material and then gradually advance forward.

The timing of the machine is such that the travel within the tunnel structure is of sufficient duration to permit the material to set, so that by the time it exits from the tunnel portion of the machine it will maintain its shape, which obviously is defined by the walls of the tunnel and of the movable plates. After each of the separate plates moves out of the tunnel, there is an additional path of travel during which the prints or blocks are exposed to the air. When each respective angle plate reaches the discharge end of the machine, the blocks may be discharged upon an endless belt or into a suitable container.

After the blocks or prints are removed from the machine, they are not suitable for marketing until tempered because the material that solidifies and hardens is brittle. The blocks or prints, after removal from the machine, are tempered in a chamber where the temperature is raised to approximately ninety-five degrees and held at this temperature for twelve or fourteen hours. This results in a thorough tempering of the blocks or prints, so that they are ready for commercial use.

Ordinarily the blocks or prints are sold by weight, which necessarily must be accurately adjusted, and for this reason the cubic content of the chambers receiving and advancing the material may be slightly varied by raising and lowering the plate 37 in the manner that is obvious from the description of the construction.

From the foregoing, it will be understood that the mechanism as described is one especially and peculiarly adapted to the attainment of the objects hereinbefore set forth; that it provides a mechanism for the accurate formation of the blocks or prints of such material as puff-paste in a continuous and automatic manner; and is a substantial advance over the present practice for forming the blocks or prints.

What I claim and desire to secure by Letters Patent is:

1. In an apparatus of the class described, the combination of an endless conveyor, with a series of angle plates pivotally connected to said conveyor having one wall parallel therewith and one wall perpendicular thereto, a tunnel through which said plates move successively, said tunnel comprising side vertical walls and a top wall forming chambers with said plates, a filler opening arranged to discharge material successively into said chambers, and means for moving said conveyor at regulated speeds in timed relation to the rate of solidification to permit the material delivered to said chambers to substantially solidify by the time it leaves said tunnel.

2. In an apparatus of the class described, the combination of an endless conveyor carrying a series of plates which form the front, rear, and bottom walls of a series of juxtaposed containers, a tunnel including a top wall and spaced side walls through which said conveyor moves, the walls of the tunnel being positioned so as to form chambers with said plates, means for introducing material successively into said chambers during their movement therethrough, and means for regulating the speed of movement of said conveyor.

3. In an apparatus of the class described, a series of angle plates arranged to move longitudinally across the top of the machine, stationary vertical walls between which said angle plates are moved, a top plate movable vertically with respect to said side vertical walls, a filler opening arranged to discharge material into the space defined by said vertical walls, said movable angle plates and said top plate, and means for regulating the speed of movement of said angle plates.

4. In an apparatus of the class described, the combination with a frame, of a chain conveyor, sprocket wheels supported in the frame of the machine at opposite ends thereof carrying said conveyor, power means for driving one of said sprockets at regulated speeds, a series of angle plates supported on the conveyor having one wall thereof parallel with the conveyor and one wall vertical in respect thereof, an enclosed tunnel at one end of said machine through which said angle plates are moved to form with said tunnel separated conical chambers, means for discharging material into said chambers during their movement through said tunnel, and guide rails for supporting and aligning said angle plates during their movement through the machine.

5. In an apparatus of the class described, the combination of an endless conveyor, with a series of angle plates pivotally connected to said conveyor having one wall parallel therewith and one wall perpendicular thereto, a tunnel through which said plates move successively, said tunnel comprising side vertical walls and a top wall forming chambers with said plates, supporting rails within the tunnel for supporting and guiding said plates, a filler opening arranged to discharge material successively into said chambers, and means for moving said conveyor at regulated speeds in timed relation to the rate of solidification to permit the material delivered to said chambers to substantially solidify by the time it leaves said tunnel.

6. In an apparatus of the class described, the combination of an endless conveyor carrying a series of plates forming the bottom and end walls of a chamber, a tunnel including top and side walls through which said conveyor moves which forms chambers with said plates, means for introducing material successively into said chambers during their movement through the tunnel, and means for moving said conveyor.

7. In an apparatus of the class described, a series of angle plates arranged to move longitudinally across the top of the machine, rails for supporting and guiding said plates, stationary vertical walls between which said angle plates are moved, a top plate movable vertically with respect to said side vertical walls, means for adjusting said top plate vertically, a filler opening arranged to discharge material into the space defined by said vertical walls, said movable angle plates and said top plate, and means for regulating the speed of movement of said angle plates.

8. In an apparatus of the class described, the combination of a frame, a chain conveyor, sprocket wheels supported in the frame of the machine at opposite ends thereof carrying said conveyor, power means for driving one of said sprockets at regulated speeds, a series of angle plates supported on the conveyor having one wall thereof parallel with the conveyor and one wall vertical in respect thereof, an enclosed tunnel at one end of said machine into which said angle plates are moved to form with said tunnel separated chambers, and means for discharging material into said chambers during their movement through said tunnel.

9. In an apparatus of the class described, the combination of an endless conveyor with a series of angle plates pivotally connected to said conveyor and having one wall parallel therewith and one wall perpendicular thereto, a tunnel through which said plates move successively, said tunnel comprising side vertical walls and a top wall forming a series of chambers with said angle plates, said top wall being movable vertically with respect to said side walls, means for adjusting said top wall vertically, a filler opening arranged to discharge material successively into said chambers, and means for moving said conveyor at regulated speeds to permit the material delivered to said chambers to substantially solidify by the time it leaves said tunnel.

10. In an apparatus of the class described, the combination of an endless conveyor with a series of angle plates pivotally connected to said conveyor and having one wall parallel therewith and one wall perpendicular thereto, said angle plates being arranged to move longitudinally across the top of the apparatus, rails for supporting and guiding said plates, a tunnel through which said plates move successively, said tunnel comprising side vertical walls and a top wall forming a series of chambers with said angle plates, said top wall being movable vertically with respect to said side vertical walls, means for adjusting said top wall vertically, a filler opening arranged to discharge material successively into said chambers, and means for moving said conveyor at regulated speeds to permit the material delivered to said chambers to substantially solidify by the time it leaves said tunnel.

GERRIT J. VAN AMERSFORT.

REFERENCES CITED

The following references are of record in the file of this patent:

UNITED STATES PATENTS

| Number | Name | Date |
|---|---|---|
| 1,413,870 | Paley | Apr. 25, 1922 |
| 1,440,715 | Bliss | Jan. 2, 1923 |
| 1,487,726 | De Bay | Mar. 25, 1924 |
| 1,558,284 | Paley | Oct. 20, 1925 |
| 1,782,413 | Dietrichs | Nov. 25, 1930 |
| 1,810,864 | Vogt | June 16, 1931 |
| 1,856,153 | Borg | May 2, 1932 |
| 1,883,482 | Bausman et al. | Oct. 18, 1932 |